April 26, 1966     W. PECHY     3,248,118
DISCHARGE DEVICES FABRICATING APPARATUS AND METHOD
Filed Dec. 11, 1961     4 Sheets-Sheet 2
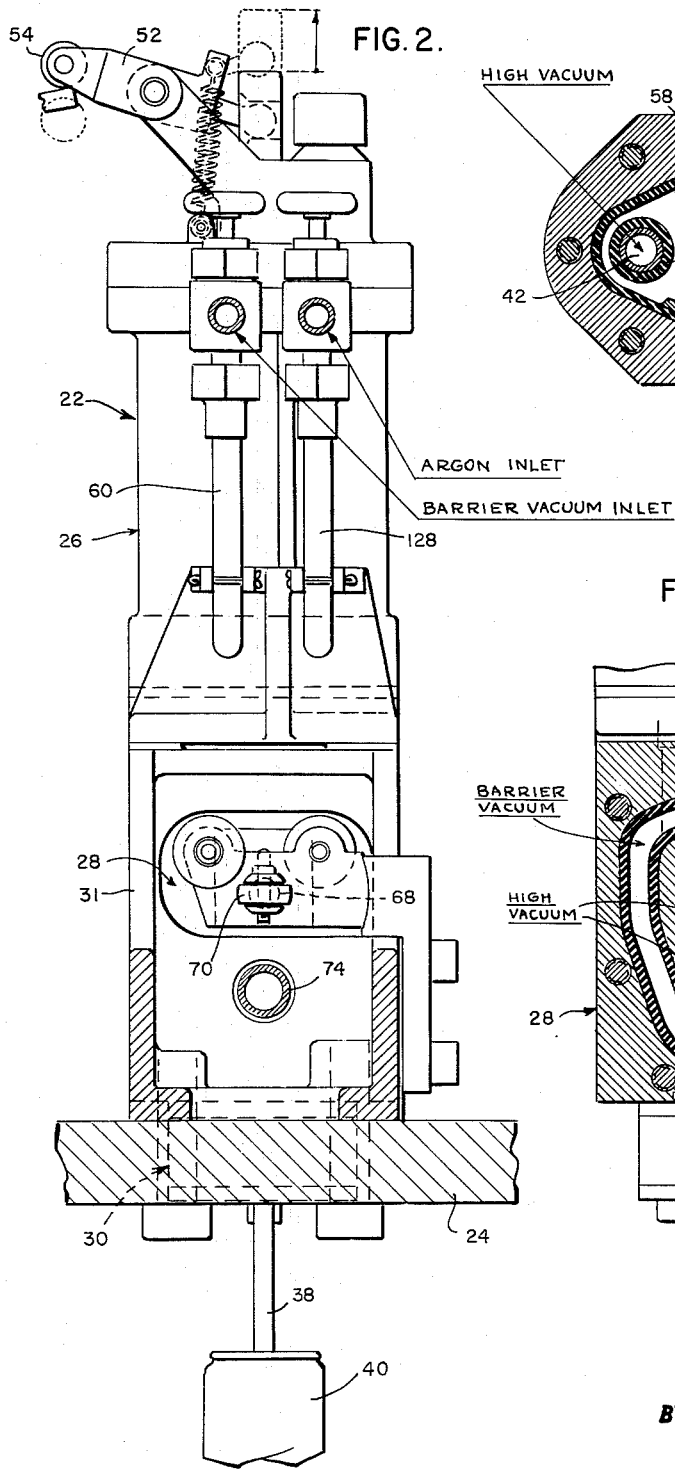
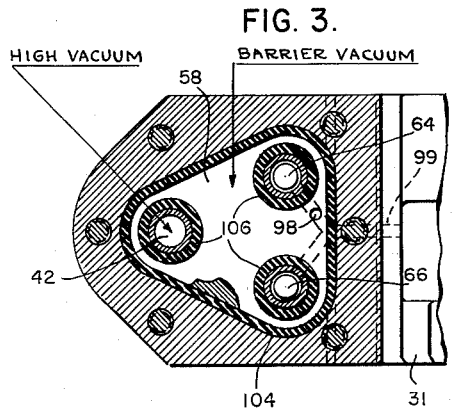
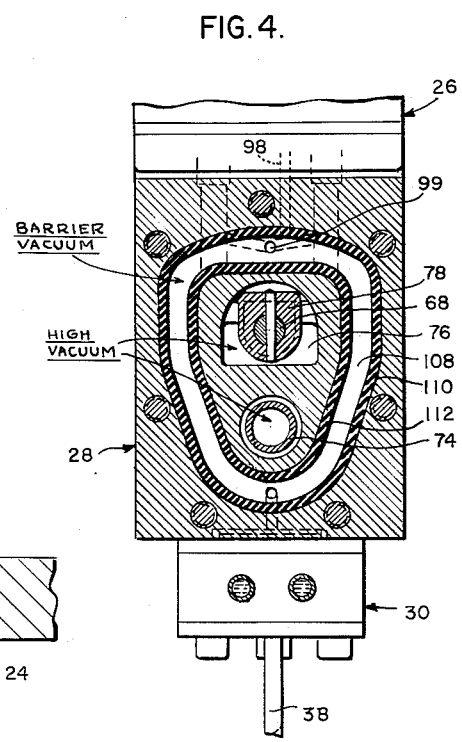
INVENTOR.
WILLIAM PECHY.
BY
W. D. Palmer
ATTORNEY.

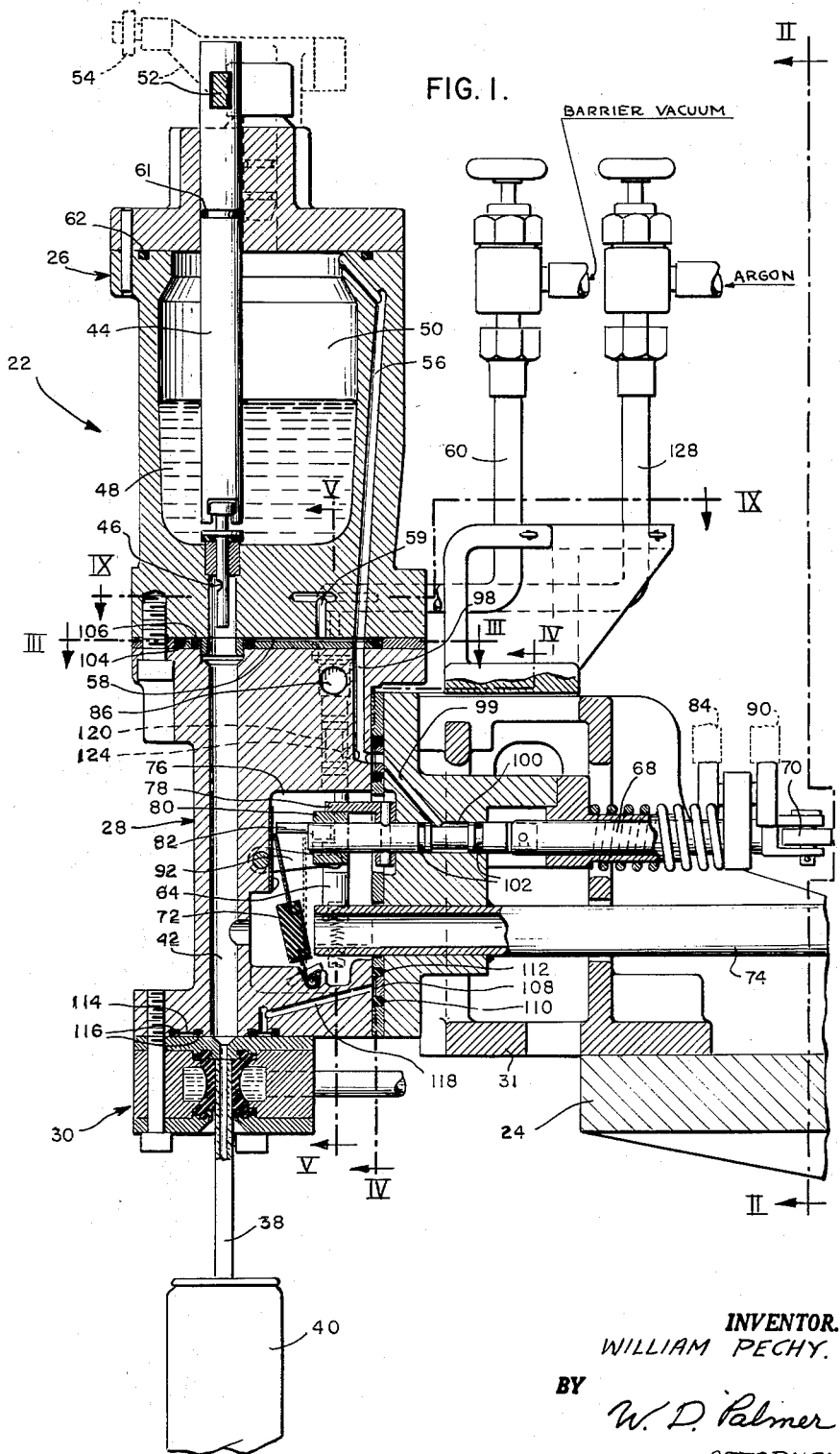

April 26, 1966 W. PECHY 3,248,118
DISCHARGE DEVICES FABRICATING APPARATUS AND METHOD
Filed Dec. 11, 1961 4 Sheets-Sheet 3

INVENTOR.
WILLIAM PECHY.
BY W. D. Palmer
ATTORNEY.

April 26, 1966  W. PECHY  3,248,118
DISCHARGE DEVICES FABRICATING APPARATUS AND METHOD
Filed Dec. 11, 1961  4 Sheets-Sheet 4
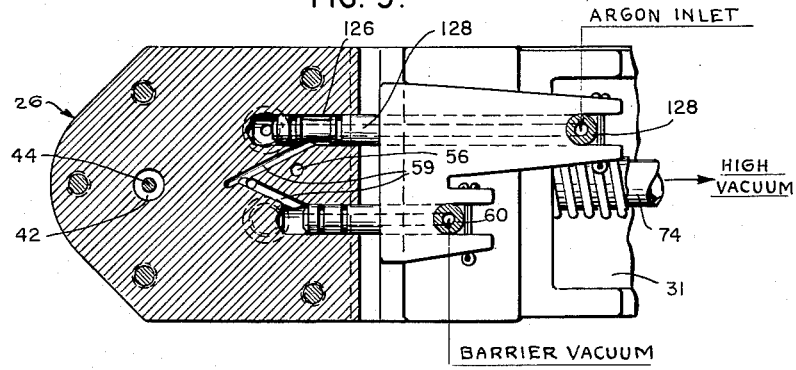
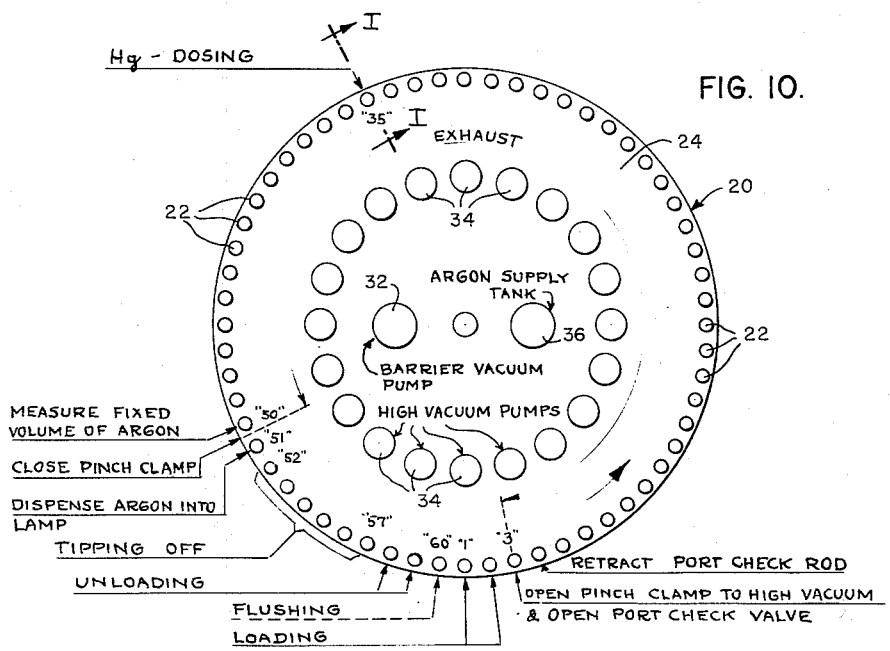
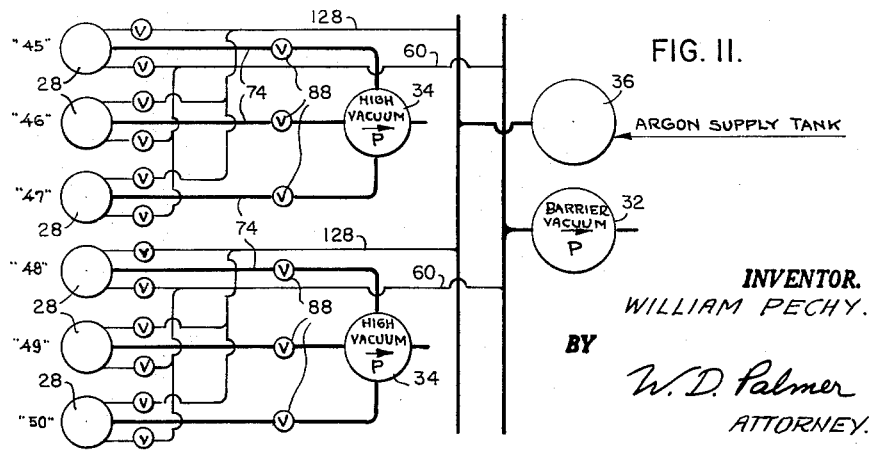
INVENTOR.
WILLIAM PECHY.
BY
W. D. Palmer
ATTORNEY.

United States Patent Office 3,248,118
Patented Apr. 26, 1966

3,248,118
DISCHARGE DEVICES FABRICATING
APPARATUS AND METHOD
William Pechy, Wall Township, Monmouth County, N.J., assignor to Westinghouse Electric Corporation, East Pittsburgh, Pa., a corporation of Pennsylvania
Filed Dec. 11, 1961, Ser. No. 158,367
5 Claims. (Cl. 277—1)

This invention relates to fabricating apparatus for discharge devices and, more particularly, to improved mercury-dosing and gas-filling apparatus and method for performing fabricating operations on a partially fabricated, mercury-vapor, gas-discharge device.

In the fabrication of discharge devices, such as conventional fluorescent lamps, the envelope is first coated with a phosphor material and electrodes are sealed into either end of the coated envelope. In the next fabricating operation, the envelope is exhausted, dosed with mercury, filled with an inert, ionizable, starting gas, such as argon, and the lamp tubulation tipped off.

In the practices of the prior art, it has been customary to operate mercury dosing devices by means of a solenoid. With ever increasing speeds of operation of the fabricating apparatus, troubles have been encountered because of the relatively low speed of the solenoid-operated mercury dosers. In addition, with present mercury dosers, air and other impurities are often drawn into the mercury reservoir and eventually into the discharge device being processed, thereby creating starting and other operating faults in the completed lamp. Flourescent lamps are filled with an inert, ionizable, starting gas to a predetermined pressure, in order to facilitate initiating the discharge. Troubles have also been encountered with respect to introducing air and other impurities into the starting gas and hence into the lamp.

It is the general object of the present invention to avoid and overcome the foregoing and other difficulties of and objections to prior art practices by the provision of a mercury dosing apparatus in which impurities are removed and cannot contaminate the mercury which is introduced into the lamp.

It is another object to provide an improved gas metering apparatus for processing discharge devices, wherein a mechanically operated gas metering device is provided to accurately measure a predetermined amount of starting gas for gas filling a discharge device.

It is a further object to provide a lamp fabricating apparatus wherein impurities are automatically precluded from contaminating the starting gas fill for discharge devices.

It is an additional object to provide an improved mercury-dosing and gas-filling apparatus for discharge devices, which apparatus is very fast in action and is entirely mechanically operated and wherein the mercury and starting gas fill in the fabricating device are maintained in a purified condition at all times throughout the fabricating operation.

It is yet another object to provide an improved method for sealing against ingress of gaseous impurities.

The aforesaid objects of the invention, and other objects which will become apparent as the description proceeds, are achieved by providing a pair of mechanically operated valves, one of which connects to a reservoir of starting gas and the other which connects to the open tubulation of the partially fabricated lamp. Between these valves there is provided a passageway of predetermined dimensions. The valve which connects to the starting gas reservoir is first opened to admit starting gas to the passageway which is contained between the two valves. Thereafter the first valve closes and the second valve then opens to permit a predetermined measured amount of starting gas to flow into the partially fabricated lamp. In order to preclude any impurities from being introduced into this starting gas, barrier vacuum chambers are provided between the operating valves and other portions of the apparatus so that any air or other gaseous impurity which leaks through the seals is immediately removed and precluded from contaminating the starting gas. In addition, a barrier vacuum chamber is provided over the mercury reservoir so that any air or other impurity which leaks into the chamber above the mercury reservoir is immediately removed, thereby maintaining in a substantially pure condition the mercury which is dosed into the discharge devices.

For a better understanding of the invention, reference should be had to the accompanying drawings wherein:

FIGURE 1 is a sectional elevation taken on the line I—I in FIG. 10, in the direction of the arrows, showing an exhaust head assembly at operating station "35," where the predetermined charge of mercury is dosed into the partially fabricated fluorescent lamp;

FIG. 2 is a vertical section taken on the line II—II in FIG. 1, in the direction of the arrows, showing the operating mechanism of the mercury plunger at the mercury dosing station, as well as the starting gas, barrier vacuum and high vacuum supply lines;

FIG. 3 is a horizontal sectional view taken on the line III—III of FIG. 1, in the direction of the arrows, showing the barrier vacuum chamber which is positioned intermediate the valve head assembly and the mercury doser assembly;

FIG. 4 is a sectional elevation taken on the line IV—IV in FIG. 1, in the direction of the arrows, showing the barrier vacuum chamber which is positioned intermediate the mounting bracket and the exhaust head assembly;

FIG. 9 is a horizontal sectional view taken on the line IX—IX in FIG. 1, in the direction of the arrows, showing details of the barrier vacuum connection to the exhaust head assembly and the barrier vacuum chamber which is positioned between the argon supply line and the atmosphere;

FIG. 10 is a diagrammatic view showing the general arrangement of the fabricating apparatus, the individual vacuum pumps and the starting gas reservoir; and FIG. 11 is a diagrammatic view showing the connections and associated pinch clamp valves for the vacuum pump and starting gas supply reservoir.

GENERAL OPERATION OF APPARATUS

Figure 5:
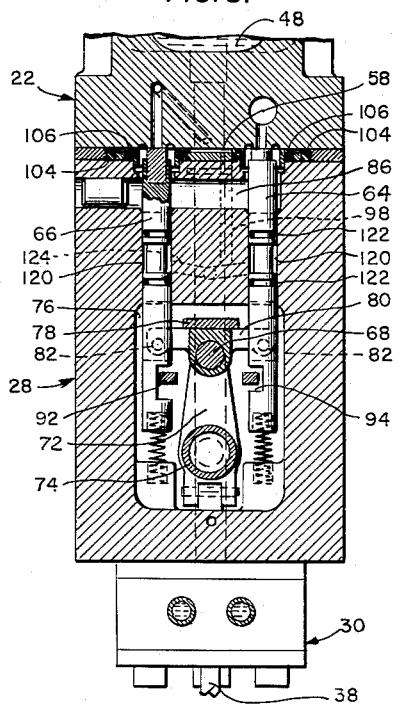
FIG. 5 is a vertical sectional view taken on the line V—V in FIG. 1, in the direction of the arrows, showing the position of the gas-measuring valves during exhaust of the lamp.

With specific reference to the form of the invention illustrated in the drawings, the lamp fabricating apparatus 20 is shown in diagrammatic view in FIG. 10 and generally comprises a plurality of identical exhaust head assemblies 22 which are positioned about a turret 24 and indexed through a series of work stations "1" through "60." In the apparatus embodiment as shown, sixty identical exhaust head assemblies 22 are indexed through the sixty work stations. Briefly describing the operation of the apparatus 20, the partially fabricated devices are loaded at stations "1" and "2." The devices are exhausted beginning at station "3" and are baked in conventional fashion in order to remove impurities. Exhausting continues to station "50." At station "35" the partially fabricated devices are dosed with mercury, as will be explained in detail hereinafter. At stations "50" and "51," a predetermined measured amount of starting gas, such as argon, is placed into the partially fabricated devices, and at stations "52" to "57," the exhaust tubulation is tipped off to seal the devices. The sealed devices are then unloaded at stations "58" and "59" and the system is flushed with inert gas prior to reloading.

EXHAUST HEAD ASSEMBLY

Each exhaust head assembly 22 is identical and in FIG. 1 is shown a sectional view of an exhaust head assembly at the mercury dosing station "35." The exhaust head 22 basically comprises a mercury doser assembly 26, a valve head assembly 28 and a compression rubber sealing assembly 30. A mounting bracket 31 secures the exhaust head assembly to the turret 24. A barrier vacuum pump 32 (shown in diagrammatic form in FIG. 11) connects to the mercury doser assembly 26 and the valve head assembly 28. A high vacuum producing pump 34 (shown in diagrammatic form in FIG. 11) connects to the valve head assembly 28, and a starting gas supply tank 36 (shown in block form in FIG. 11) also connects to the valve head assembly 28. Conventional cam actuating means are positioned at the individual work stations as required, in order to control in predetermined sequence the individual operations of the exhaust head 22, as will be explained in detail hereinafter.

As shown in FIGS. 1 and 2, the open exhaust tubulation 38 of the partially fabricated discharge device 40 is sealed through the conventional compression rubber sealing assembly 30 which serves to form a hermetic seal about the exhaust tube 38. A suitable compression rubber assembly is generally described in U.S. Patent No. 2,336,998, dated December 14, 1943. A passageway 42 provided in the valve head assembly 28 communicates with the operating plunger 44 of the mercury doser assembly 26. At work station "35," and as shown in FIG. 1, the exhaust head 22 has just delivered a predetermined measured charge of mercury into the passageway 42 and hence into the discharge device 40 by means of the small mercury measuring cavity 46 in the plunger 44, which carries the mercury charge from the mercury reservoir 48.

MERCURY DOSER ASSEMBLY

The mercury doser assembly 26 is generally conventional in construction, except for the barrier vacuum chamber 50 which is positioned over the mercury reservoir 48. The operating plunger 44 is adapted to be depressed at station "35" to the position as shown in FIGS. 1 and 2 by means of a spring-loaded actuating lever 52 which carries a cam follower 54. In accordance with the present invention, the barrier vacuum chamber 50, which is positioned above the mercury reservoir 48, is connected by a passageway 56 to a chamber 58 in the valve head assembly 28, which chamber 58 in turn connects to the barrier vacuum pump 32 through a drilled passageway 59 and connecting tube 60. Ingress of air into the barrier vacuum chamber 50 is prevented by seals 61 and 62. In this manner, a vacuum is maintained at all times above the mercury reservoir 48 so that air or other impurities entering through seals 61 and 62 and into the chamber 50 above the mercury reservoir 48 cannot contaminate the mercury and, in turn, the discharge device being fabricated.

EXHAUST AND GAS FILL

Considering in detail the valve head assembly 28, a pair of operating valves 64 and 66 are shown in their successive operating positions in FIGS. 5 through 8.

When the head is indexed to work station "3," a spring-biased actuating rod 68 is moved to the left by a cam follower 70, as viewed in FIG. 1, in order to open the pivoted port check valve 72 to insure that the passageway 74 which connects to the high vacuum pump 34 is open. The port check valve 72 will normally remain in open position because of its own inertia, but will close if a broken envelope admits air into the cavity 76. The actuating rod 68 is also adapted to be rotated both in clockwise and counterclockwise directions, as viewed in FIGS. 5 through 8, in order to actuate the valves 64 and 66. As shown in FIGS. 1 and 2, the actuating rod 68 has affixed thereto a flange 78 which connects to a valve operating lever 80. As shown in FIGS. 5 through 8, the flange 78 has a slidable fit with the operating lever 80 and a stop 82 (see FIG. 1) prevents the operating lever 80 from moving to the left, as viewed in FIG. 1, when the actuating rod 68 is moved to the left to open the port check valve 72.

When the exhaust head assembly 22 is at work station "3," the actuating rod 68 will have opened the port check valve 72 in order to evacuate the discharge device and the cavity 76. In this position, the valves 64 and 66 will both be closed, as shown in FIG. 5. Thereafter, the exhausted and baked device 40 will be indexed to work station "35" where mercury is dosed into the device 40. At the following work station, the plunger 44 will elevate from that position shown in FIGS. 1 and 2, and the exhaust head 22 subsequently will be indexed to station "50."

Figure 6:
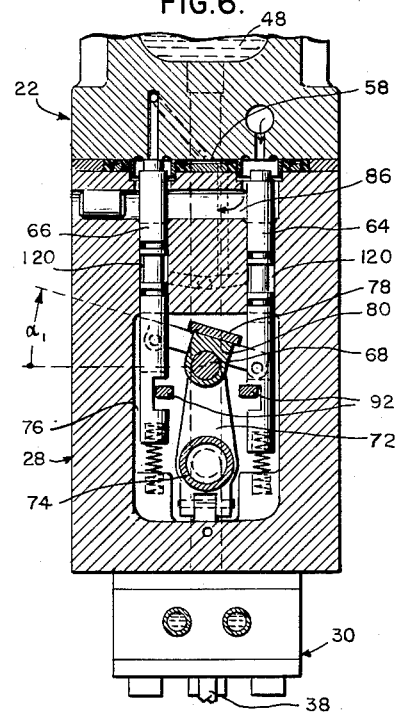
FIG. 6 is a view generally similar to FIG. 5, but showing the exhaust head at station "50" in FIG. 10, at which station a predetermined volume of starting gas is accurately measured.

At station "50," a cam 84 (see FIG. 1) will rotate the actuating rod 68 in a clockwise direction through an angle $\alpha_1$, as seen in FIG. 6. This will permit a predetermined, measured quantity of argon to be admitted into the passageway 86 which connects between the valves 64 and 66, in order to fill this passageway with argon. Simultaneouly, cam-actuated pinch clamp valves 88 (see FIG. 11) close off the line leading to the high vacuum pump 34. Such pinch clamp valves are known in the art and are described in U.S. Patent 2,812,228, dated November 5, 1957.

Figure 7:
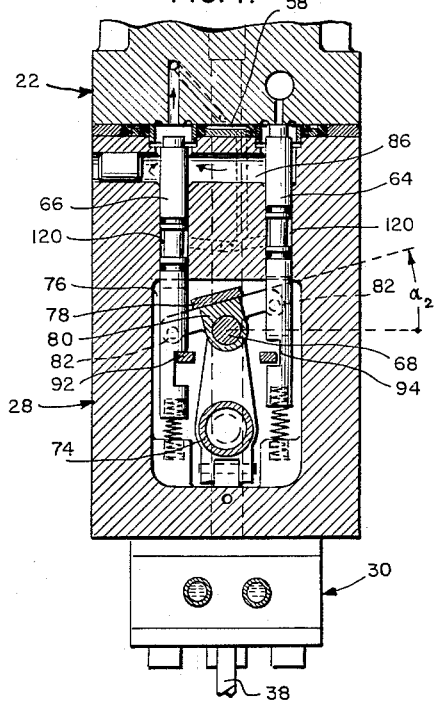
FIG. 7 is a view generally similar to FIGS. 5 and 6, but showing the measured volume of starting gas being metered into the lamp at station "51" in FIG. 10.

As the exhaust head 22 is indexed to station "51," a cam 90 (see FIG. 1) rotates the actuating rod 68 in a counterclockwise direction, as viewed in FIG. 7, through an angle $\alpha_2$. The rotation of the actuating rod causes the valve 64 to close before the valve 66 is opened and on opening of the valve 66, the measured quantity of argon which is entrapped in the passageway 86 fills the cavity 76, the previously evacuated passageway 42, and the discharge device 40. As an example, the respective volumes of the discharge device and the evacuated portions of the valve head assembly 28 are so chosen with respect to the dimensions of the passageway 86 and the argon pressure at the tank 36 that the discharge device 40 is filled with argon at a pressure of approximately 4 mm. mercury.

As the head 22 is indexed from station "51" to station "52," both valves 64 and 66 are closed and the device 40 is tipped off in accordance with conventional practices to seal the measured quantities of mercury and argon therein.

Figure 8:
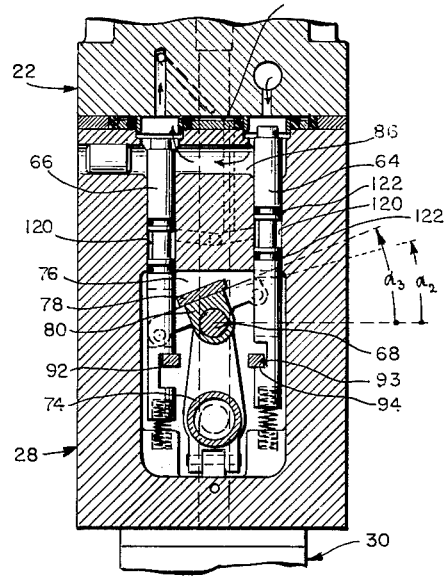
FIG. 8 is a view generally similar to FIGS. 5–7 showing the exhaust head at station "60," wherein the system is flushed with argon in order to remove any possible impurities.

If it is desired to flush the passageways and cavities within the valve head assembly 28 with starting gas, in order to remove any possible impurities, an additional cam can be provided to rotate the actuating rod 68 through an angle $\alpha_3$, as viewed in FIG. 8. This additional rotation further depresses the valve 66 which depresses a pivoted, forked connecting lever 92, as shown in FIGS. 1 and 8. The depression of the lever 92 by the valve 66 causes the opposite arm 93 of the forked lever 92 to contact a recess 94 in the valve 64, in order to open the valve 64 and flush the entire system with argon.

BARRIER VACUUM SYSTEM

As has been previously explained, the chamber 50 above the mercury reservoir 48 is protected from contamination by connection to a barrier vacuum pump 32. In accordance with the present invention, all operating portions of the valve head assembly 28 are also protected from contamination by means of barrier vacuum chambers. The barrier vacuum pump 32 is operated at all times so that any impurities which may find ingress through the seals of the exhaust head are immediately removed by the dynamic barrier vacuum system before they can contaminate the discharge devices being processed.

The barrier vacuum line 60 connects to a barrier vacuum chamber 58, as shown in FIGS. 1 and 3, through the drilled passageway 59. Drilled passageways 98 and 99 connect chamber 58 to a chamber 100, which is provided about a portion of the actuating rod 68 between the seals 102 which seal the cavity 76 from the atmosphere. Any air or other impurity which leaks past the seals 102 is immediately removed by the barrier vacuum pump 32.

As shown in FIGS. 1 and 3, the barrier vacuum chamber 58, which is interposed between the mercury doser assembly 26 and the valve head assembly 28, has a seal 104 circumferentially disposed thereabout and additional seals 106 are provided about the gas and vacuum lines which pass between the assemblies.

A barrier vacuum chamber 108 is provided between the valve head assembly 28 and the supporting bracket 31 (see FIGS. 1 and 4), along with circumferentially disposed seals 110 and 112 which bound the chamber 108. The chamber 108 is connected to the chamber 58 by the drilled passageways 98.

A barrier vacuum chamber 114 is also desirably provided between the valve head assembly 28 and the compression rubber assembly 30, along with surrounding seals 116. A drilled passageway 118 connects the chamber 114 to the chamber 108, see FIG. 1.

In order to prevent any possible leakage between the cavity 76 and the starting gas measuring passageway 86, additional barrier vacuum chambers 120 are provided intermediate the seals 122 for the valves 64 and 66. Drilled passageways 124 connect the chambers 120 to the drilled passageway 98, see FIGS. 1 and 5. A sealed barrier vacuum chamber 126 is also provided about the argon supply line 128 where it enters the mercury doser assembly 26, see FIGS. 1 and 9.

It will be seen that a plurality of barrier vacuum chambers are included at all places where atmospheric air or other contamination could leak into the exhaust head 22. In this manner, leakage is prevented between the atmospheric air and the high vacuum exhaust system, the mercury supply and the argon supply, and between the argon supply system and the high vacuum exhaust system. As a result, any possible impurities are prevented from entering into the lamp being fabricated.

It will be recognized that the objects of the invention have been achieved by providing an improved dosing apparatus wherein the mercury which is dosed into a discharge device is maintained in a pure condition at all times. In addition, the starting gas with which the partially fabricated discharge device is filled is maintained pure at all times and is measured very carefully. There has been provided a mechanical mercury dosing and gas-filling system which is extremely fast in operation and which will provide very pure mercury and starting gas to the discharge device being fabricated.

While one specific best example has been illustrated and described hereinbefore, it is to be particularly understood that the invention is not limited thereto or thereby.

I claim as my invention:

1. In combination with an exhaust, mercury-dosing and gas-filling apparatus for performing fabricating operations on a partially fabricated mercury-vapor gas-discharge device having an open exhaust tube, the improved exhaust head assembly which comprises: (A) sealing means communicating with and forming a hermetic seal about the exhaust tube of said discharge device, (B) valve head means communicating with said sealing means and including a plurality of operating valves sealed against ingress of impurities, and (C) mercury dosing means including a mercury reservoir sealed against ingress of impurities; barrier-vacuum-producing means connecting to components comprising said exhaust head assembly; high-vacuum-producing means connecting to said valve head means; starting-gas-supply means connecting to said valve head means; and actuating means for controlling in predetermined sequence the operation of said mercury dosing means, said valve head means, said high-vacuum-producing means, and said starting-gas-supply means to charge said partially fabricated discharge device with a predetermined quantity of mercury and a predetermined quantity of starting gas; a plurality of barrier vacuum chambers positioned adjacent the seals for the operating portions of the components comprising said exhaust head assembly to receive any gaseous impurities which might find ingress into said exhaust head assembly; and said barrier-vacuum-producing means connecting to said barrier vacuum chambers to pump from such chambers and from said exhaust head assembly any gaseous impurities which find ingress thereto.

2. In combination with an exhaust, mercury-dosing and gas-filling apparatus for performing fabricating operations on a partially fabricated mercury-vapor gas-discharge device having an open exhaust tube, an improved exhaust head assembly which comprises: (A) sealing means communicating with and forming a hermetic seal about the exhaust tube of said discharge device, (B) valve head means communicating with said sealing means and including: (a) a plurality of operating valves adapted to be actuated to control the individual operations of exhaust and gas fill for said discharge device, and (b) a plurality of seals operatively associated with said operating valves to seal against ingress of atmosphere to said operating valves, and (C) mercury dosing means including a mercury reservoir, a barrier chamber thereover, and a mercury-dispensing means operable to deliver a predetermined quantity of mercury through said valve-head means and said sealing means and into said partially fabricated discharge device; barrier-vacuum-producing means communicating with said mercury-dosing means and said valve-head means; high-vacuum-producing means connecting to said valve head means; starting-gas-supply means connecting to said valve-head means; and actuating means for controlling in predetermined sequence, the operation of said valve-head means, said mercury-dosing means, and the application of high vacuum and delivery of starting gas to said valve-head means; the components comprising said exhaust head assembly operable when actuated to perform the following work functions in the following sequence: (1) said valve-head means operable first to connect said high vacuum producing means to the open tubulation of said discharge device, (2) said mercury-dosing means operable to deliver a predetermined charge of mercury through said valve-head means and into the open tubulation of said discharge device, and (3) said valve-head means operable to deliver to the discharge device through the open tubulation thereof a measured predetermined charge of starting gas; barrier chambers communicating with the valve seals in said valve-head means; and said barrier vacuum producing means connected to said barrier chambers in said valve head means and to the barrier chamber provided above the mercury reservoir in said mercury-dosing means; whereby any leakage of atmosphere into the barrier chamber in said assembly is removed by said barrier-vacuum-producing means to minimize any possible contamination of said discharge device.

3. The combination as specified in claim 2, wherein additional sealed barrier chambers communicate with all gaseous material seals associated with said exhaust head assembly, and said additional barrier chambers all connecting to said barrier-vacuum-producing means.

4. The method of supplementing the action of seals which protect against ingress of gaseous impurity into a volume which contains a desired substance, which method comprises, maintaining a barrier vacuum between all of said seals which are proximate to said volume to be protected and any path through which gaseous impurity might find ingress to the said seals which are proximate to said volume to be protected.

5. In combination, an operating device required to be protected against ingress of gaseous impurity and which device contains a desired substance, a plurality of paths which could provide ingress of gaseous impurity to said operating device, spaced sealing means in each said path which could provide ingress of gaseous impurity to said device, a chamber in communication with each said path and between each of said spaced sealing means, and vacuum-producing means connecting to each said chamber, whereby any gaseous impurity which finds ingress to each said chamber is removed by said vacuum-producing means.

References Cited by the Examiner

UNITED STATES PATENTS

| | | | |
|---|---|---|---|
| 1,037,824 | 9/1912 | Fasting. | |
| 1,978,913 | 10/1934 | Ficci | 141—59 X |
| 2,265,676 | 12/1941 | Stoddard | 222—152 X |
| 2,313,657 | 3/1943 | Marshaus | 141—59 X |
| 2,341,579 | 2/1944 | Sundstrum | 222—3 |
| 2,364,400 | 12/1944 | Stewart et al. | 141—59 |
| 2,479,737 | 8/1949 | Garretson et al. | 222—3 |
| 2,880,762 | 4/1959 | Breeback | 141—48 |
| 2,898,953 | 8/1959 | Berthelsen et al. | 141—48 |
| 2,951,513 | 9/1960 | Wilson et al. | 141—65 |

OTHER REFERENCES

A. Guthrie and R. K. Wakerling, Vacuum Equipment and Techniques, McGraw-Hill, 1949, pp. 154 and 166.

LAVERNE D. GEIGER, *Primary Examiner.*

ROBERT A. LEIGHEY, *Examiner.*